(12) United States Patent
Zhang et al.

(10) Patent No.: US 11,503,450 B2
(45) Date of Patent: Nov. 15, 2022

(54) DEVICE DISCOVERY USING SIDELINK DISCOVERY MESSAGES

(71) Applicant: Telefonaktiebolaget LM Ericsson (publ), Stockholm (SE)

(72) Inventors: Zhang Zhang, Beijing (CN); Marco Belleschi, Solna (SE); Liang Hu, Stockholm (SE); Jingya Li, Gothenburg (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 603 days.

(21) Appl. No.: 16/327,165

(22) PCT Filed: Sep. 18, 2018

(86) PCT No.: PCT/CN2018/106135
§ 371 (c)(1),
(2) Date: Feb. 21, 2019

(87) PCT Pub. No.: WO2020/056578
PCT Pub. Date: Mar. 26, 2020

(65) Prior Publication Data
US 2021/0258764 A1 Aug. 19, 2021

(51) Int. Cl.
H04W 8/00 (2009.01)
H04W 76/14 (2018.01)
H04W 4/02 (2018.01)
H04W 72/04 (2009.01)

(52) U.S. Cl.
CPC .......... *H04W 8/005* (2013.01); *H04W 4/023* (2013.01); *H04W 72/0406* (2013.01); *H04W 76/14* (2018.02)

(58) Field of Classification Search
CPC ..... H04W 92/18; H04W 8/005; H04W 76/14; H04W 4/02; H04W 72/06; H04L 29/08
See application file for complete search history.

(56) References Cited

U.S. PATENT DOCUMENTS

| 10,855,401 | B2* | 12/2020 | Lee | ............................ H04L 1/08 |
| 11,259,307 | B2* | 2/2022 | Aiba | ......................... H04J 11/00 |
| 2017/0086238 | A1 | 3/2017 | Lee et al. | |
| 2017/0181206 | A1 | 6/2017 | Lee et al. | |
| 2017/0215059 | A1 | 7/2017 | Agiwal et al. | |
| 2018/0007400 | A1 | 1/2018 | Chen et al. | |

(Continued)

FOREIGN PATENT DOCUMENTS

| CN | 107431909 A | 12/2017 |
| EP | 3 133 842 A1 | 2/2017 |

(Continued)

OTHER PUBLICATIONS

International Search Report and Written Opinion dated Apr. 30, 2019 issued in International Application No. PCT/CN2018/106135. (8 pages).

(Continued)

*Primary Examiner* — Khawar Iqbal
(74) *Attorney, Agent, or Firm* — Rothwell, Figg, Ernst & Manbeck, P.C.

(57) ABSTRACT

Flexible physical channel configurations that support efficient transmission of discovery messages thereby enabling, among other things, SL discovery enhancement for NR. In one aspect, discovery messages are carried on either the PSCCH or the PSSCH or both.

16 Claims, 5 Drawing Sheets

(56) References Cited

U.S. PATENT DOCUMENTS

| | | | |
|---|---|---|---|
| 2018/0035276 A1* | 2/2018 | Kang | H04W 48/08 |
| 2018/0139599 A1 | 5/2018 | Yasukawa et al. | |
| 2018/0213382 A1 | 7/2018 | Tabet et al. | |
| 2019/0229964 A1* | 7/2019 | Ouchi | H04W 92/18 |
| 2021/0068120 A1* | 3/2021 | Jung | H04W 76/14 |
| 2021/0168589 A1* | 6/2021 | Yasukawa | H04W 8/24 |
| 2021/0377806 A1* | 12/2021 | Osawa | H04W 4/40 |
| 2021/0377956 A1* | 12/2021 | Lee | H04W 72/0486 |
| 2022/0030580 A1* | 1/2022 | Lee | H04W 72/0406 |
| 2022/0039149 A1* | 2/2022 | Chen | H04W 88/04 |
| 2022/0046469 A1* | 2/2022 | Yasukawa | H04W 28/04 |
| 2022/0103409 A1* | 3/2022 | Xiong | H04L 27/2613 |

FOREIGN PATENT DOCUMENTS

| | | | |
|---|---|---|---|
| EP | 3 200 555 A1 | 8/2017 | |
| WO | 2016/163972 A1 | 10/2016 | |
| WO | WO-2017171897 A1 * | 10/2017 | H04W 72/04 |
| WO | 2018/012424 A1 | 1/2018 | |

OTHER PUBLICATIONS

Huawei et al., "Corrections on V2V descriptions in TS 36.302", Change Request, 3GPP TSG-RAN WG2 Meeting #96, R2-168935, (Nov. 2016). (7 pages).

ZTE, "Correction on TS 36.302 for V2V", Change Request, 3GPP TSG-RAN WG2 Meeting #95bis, R2-166553, (Oct. 2016). (5 pages).

Alcatel-Lucent Shanghai Bell et al., "Support out-of-coverage and partial coverage discovery", 3GPP TSG RAN WG1 Meeting #80bis, R1-151327, Belgrade, Serbia, Apr. 20-24, 2015 (3 pages).

* cited by examiner

DEVICE DISCOVERY USING SIDELINK DISCOVERY MESSAGES

CROSS REFERENCE TO RELATED APPLICATION(S)

This application is a 35 U.S.C. § 371 National Stage of International Patent Application No. PCT/CN2018/106135, filed Sep. 18, 2018, designating the United States.

TECHNICAL FIELD

Disclosed are embodiments related to device discovery.

BACKGROUND

There are many applications in which it is advantageous for a first wireless communication device (WCD) to communicate with a second WCD using a direct link rather than using an access point (e.g., a base station of a radio access network (RAN), or a Wi-Fi access point) or network to relay messages between the two WCDs. As used herein the term "message" is used broadly to mean any unit of data (e.g., a bit, a byte, a protocol data unit, an application layer message, etc.). Such direct communication over a direct link is commonly referred to as Device-to-Device (D2D) communication. As used herein a WCD is any device capable of wireless communication (e.g., a smartphone, a tablet, a sensor, an Internet-of-Things (IoT) device, etc.). A WCD is also commonly referred to as a "User Equipment" (UE).

To support D2D communication several D2D channels (a.k.a., "sidelink" channels) are employed. These sidelink channels include: (1) a physical sidelink broadcast channel (PSBCH); (2) a physical sidelink shared channel (PSSCH); (3) a physical sidelink control channel (PSCCH); (4) a physical sidelink discovery channel (PSDCH).

PSBCH carries the basic system information, required by an out-of-coverage UE to establish sidelink connectivity. PSSCH is used for carrying application data. PSCCH carries sidelink control information (SCI), which enables a receiving UE to properly detect and decode the PSSCH (i.e., data transmitted over the PSSCH). PDSCH is a dedicated physical channel used for transmitting sidelink discovery messages to support the sidelink discovery procedures that are specified in LTE Rel-12 and Rel-13. In a given subframe, each physical channel is mapped to a different set of resource elements. Thus, for example, data transmitted over the PSCCH in a given subframe is transmitted using a first set of resource elements (i.e., time-frequency resources), whereas data transmitted over the PSSCH in the given subframe is transmitted using a second set of resource elements, wherein the sets do not overlap. In this way, the separate physical channels are created.

In many scenarios, before a first UE can establish a D2D communication session with a second UE, the first UE must first "discover" the second UE. There are at least two models for device discovery, which are referred to as "Model A (I am here)" and "Model B (who is there?/are you there?)".

Model A defines two roles: the Announcer and the Monitor. The announcing UE announces certain information that could be used by monitoring UEs in the proximity of the announcing UE. The monitoring UE monitors certain information of interest in proximity of announcing UEs. In this model the announcing UE wirelessly transmits (e.g., broadcasts) discovery messages and the monitoring UEs that are potentially interested in these messages read them and process them to determine if it is interested. The announcing UE may transmit the discovery message at pre-defined discovery intervals. This model is referred to as the "I am here" model because the announcing UE would typically transmit a discovery message that includes information about itself (e.g. its ProSe Application Code).

Model B also defines two roles: the Discoverer and the Discoveree. The discoverer UE wirelessly transmits a discovery message containing certain information about what it is interested to discover. The discoveree UE receives the discovery message and may respond with some information related to the discoverer's request. Model B is said to be equivalent to "who is there/are you there" because the discoverer UE sends information about other UEs that the discoverer UE would like to receive responses from, e.g. the information can be about a ProSe Application Identity corresponding to a group and the members of the group can respond.

The term "transmitting UE" ("Tx UE") may be used to refer to an announcing UE or a Discoverer UE, and the term "receiving UE" ("Rx UE") may be used to refer to a monitoring UE or a Discoveree UE.

As mentioned above, at the radio layer, discovery transmissions are carried out on a specific set of periodic time-frequency resources. These resources may be configured by an eNB in broadcast fashion (e.g., in SIB19) or in dedicated RRC signalling for UEs in connected mode. To ensure out-of-coverage operations, discovery resources can also be pre-configured in the UE to be used when there is no network coverage.

At the Medium Access Control (MAC) level, discovery transmissions are delivered on a dedicated channel, known as the sidelink discovery channel (SL-DCH), which is conveyed in a transparent MAC protocol data unit (PDU), i.e. the discovery MAC PDU consists solely of a MAC SDU whose size is aligned to a TB. The TB is of a fixed size of 232 bits and it is transmitted on 2 contiguous PRBs.

At the physical level, discovery messages are carried on a dedicated physical channel (i.e., dedicated resource elements) called PSDCH. The transmission of discovery messages on PSDCH is similar to the transmission of SCI on the PSCCH. For example, the payload size of PDSCH is fixed. A UE does blind decoding to search for PDSCH in its corresponding resource pool (this is sometimes referred to as "blind searching").

Vehicle-to-Everything (V2X) and Common Awareness Messages (CAM)

D2D communication is one type of V2X communication. V2X communication, however, includes any combination of direct communication between vehicles, pedestrians and infrastructure. V2X communication may take advantage of a network (NW) infrastructure, when available, but at least basic V2X connectivity should be possible even in case of lack of coverage. Providing an LTE-based V2X interface may be economically advantageous because of the LTE economies of scale and it may enable tighter integration between communications with the NW infrastructure (V2I), pedestrian (V2P) and other vehicles (V2V) communications, as compared to using a dedicated V2X technology.

Common Awareness Messages (CAMs) are commonly used by some (safety related) services (e.g. Approaching Emergency Vehicle, Slow Vehicle Warning, etc.). By receiving CAMs, a V2X device can be made aware of other device(s) in its neighborhood area as well as their positions, speed (both velocity and direction), basic attributes and basic sensor information. At receiver side, reasonable efforts can be taken to evaluate the relevance of the messages and the information. This allows the device to get information about its situation and act accordingly.

ETSI ITS standards also include the possibility for UEs to advertise their presence with periodic beacon transmissions. Each beacon includes a set of possible information such as the address of the sender, the ITS station type (e.g. pedestrian, bike, car, truck, etc.), speed, location etc., similar to the CAM message. By receiving such beacons, each receiver builds up a table of neighbors and their related characteristics.

Sidelink discovery enhancements for New Radio (NR) (a.k.a., 5G)

Advanced V2X services such as platooning, cooperative sensor sharing may require unicast and/or multicast V2V communications. To enable sidelink (SL) unicast/multicast connectivity, the SL UE discovery and link establishment are essential. Besides, the requirements on reliability and latency for such advanced use cases are more stringent (see, e.g., 3GPP TS 22.886). Therefore, there is a need to improve discovery performance.

SUMMARY

In international patent application number PCT/CN2018/099950, enhancements are proposed for increasing the efficiency of SL discovery and link establishment. For example, PCT/CN2018/099950 proposes including additional information in discovery messages so that discovery may be based on factors other than merely service of interest. For instance, a discovery message (e.g., a "type 1" discovery message) transmitted by a UE (the "Tx UE") that would like to establish an SL connection with the other UEs may include the following information: an SL discovery intention code, a layer-2 (L2) identifier (ID) assigned to or utilized by the Tx UE, location information indicating the location of the Tx UE, direction information indicating a direction in which the UE is traveling, Tx UE (radio) capability information, etc. Likewise, the discovery message (e.g., "type 2" discovery message) transmitted from a UE (the "Rx UE") in response to the discovery message transmitted by the Tx UE may include: an Rx UE (L2) ID, Tx UE (L2) ID, the RX UE (radio) capability information, etc. Optionally, after detecting the discovery response message transmitted by the Rx UE, the Tx UE will transmit an SL confirmation discovery message (i.e., "type 3" discovery) to confirm the SL connection establishment, which may contain a local (L2) ID for each of the Rx UEs.

PCT/CN2018/099950 also introduces a hybrid (two steps) SL discovery procedure. In this hybrid procedure UEs periodically broadcast "advertising messages" that include a set of non-radio layer related information (e.g., the proximity/location, speed, service of interest etc.). A UE that would like to establish an SL connection first determines a set of candidate peer UEs by upper layers based on the received advertising messages. Then, the UE initiates the discovery procedure by transmitting a set of radio-related information (type 1 message, multicast) to the selected candidate peer UEs. The UEs within the candidate set that receive the type 1 message (a.k.a., "message 1") and detect the discovery attempt will respond by transmitting an SL discovery response message (i.e., a type 2 discovery message) to the initiating UE. The type 2 discovery message (a.k.a., "message 2") may contain radio-related information of the candidate UEs, or just a confirmation of matching on the radio-related information between the candidate UEs and the initiating UE. In this approach, some of the SL discovery related information is sent and terminated into upper layers e.g., application layer, and the rest of the information is terminated in radio layers.

The enhanced SL discovery procedures described above require at least two discovery messages to be transmitted over physical channels. That is, message 1 transmitted from a UE to initiate the discovery procedure, and message 2 transmitted from another UE to respond the detection of the discovery attempt. Message 1 is transmitted either in a broadcast fashion or a multicast fashion, while message 2 could be transmitted in a unicast fashion.

Unlike the discovery messages specified in LTE for the SL discovery procedure, the payload size of message 1 and message 2 for the enhanced SL discovery procedure can vary significantly, depending on the use cases, applications, and service types, etc. Therefore, the existing PSDCH channel in LTE, which is designed for transmitting discovery messages of a fixed transport block size of 232 bits, cannot be used to support the transmission of the enhanced discovery messages (message 1 and message 2). Hence, currently there is lack of physical channel design to support efficient transmission of the enhanced discovery messages.

This disclosure describes flexible physical channel configurations that support efficient transmission of discovery messages thereby enabling, among other things, SL discovery enhancement for NR. In one aspect, discovery messages are carried on either the PSCCH or the PSSCH or both.

For example, at least the following four configurations are possible. A first configuration (Configuration 1) in which a PSCCH message (e.g., SCI) contains a discovery message and no other information, such as PSSCH scheduling related control information, is included in the SCI. A second configuration (Configuration 2) in which a PSCCH message (e.g., SCI) my contain both a discovery message (or part of a discovery message) and other information, such as PSSCH scheduling related control information. Additionally, in some embodiments, discovery messages are only transmitted over the PSCCH. A third configuration (Configuration 3) in which discovery messages are carried on PSSCH only, scheduled by PSCCH. And a fourth configuration (Configuration 4) in which a part of a discovery message is transmitted over the PSCCH and another part of the discovery message is transmitted over the PSSCH. The proposed configurations provide flexible and efficient transmission of discovery messages with varied payload size, which is essential to enable discovery enhancements.

In one particular aspect there is provided a process for device discovery that is performed by a Tx UE. The process includes a first UE (Tx UE) obtaining (e.g., generating, retrieving, receiving) sidelink discovery information (SDI) for use in discovering a second UE (Rx UE) in proximity to the first UE, wherein the SDI comprises at least a first part of a discovery message. The process also includes the first UE transmitting (s204) the SDI over a physical sidelink channel (PSCH). Advantageously, the PSCH is a physical sidelink control channel, PSCCH, or the PSCH is a physical sidelink shared channel, PSSCH.

In another particular aspect there is provided a process for device discovery that is performed by an Rx UE. The process includes a first UE (Rx UE) receiving, over a physical sidelink channel (PSCH) sidelink discovery information (SDI), wherein the SDI was transmitted by a second UE (Tx UE) in proximity to the first UE (Rx UE), the SDI comprises at least a first part of a discovery message, and the PSCH is the PSCCH or the PSCH is the PSSCH. The process also includes the first UE processing the received SDI.

BRIEF DESCRIPTION OF THE DRAWINGS

The accompanying drawings, which are incorporated herein and form part of the specification, illustrate various embodiments.

DETAILED DESCRIPTION

Flexible physical channel configurations are proposed to support efficient transmission of discovery messages with varied payload size. The configurations may apply to the case in which discovery messages (e.g., a discovery request or discovery response) are terminated in RAN layers and to the case in which the discovery messages are transparent to RAN layers.

For example, the following four configurations are proposed. A first configuration (Configuration 1) in which a PSCCH message (e.g., SCI) contains a discovery message and no other information, such as PSSCH scheduling related control information, is included in the SCI. A second configuration (Configuration 2) in which a PSCCH message (e.g., SCI) my contain both a discovery message (or part of a discovery message) and other information, such as PSSCH scheduling related control information. Additionally, in some embodiments, discovery messages are only transmitted over the PSCCH. A third configuration (Configuration 3) in which discovery message are carried on PSSCH only, scheduled by PSCCH. And a fourth configuration (Configuration 4) in which a part of a discovery message is transmitted over the PSCCCH and another part of the discovery message is transmitted over the PSSCH (i.e., the another part of the discovery message is included in a PSSCH message).

Figure 1A:
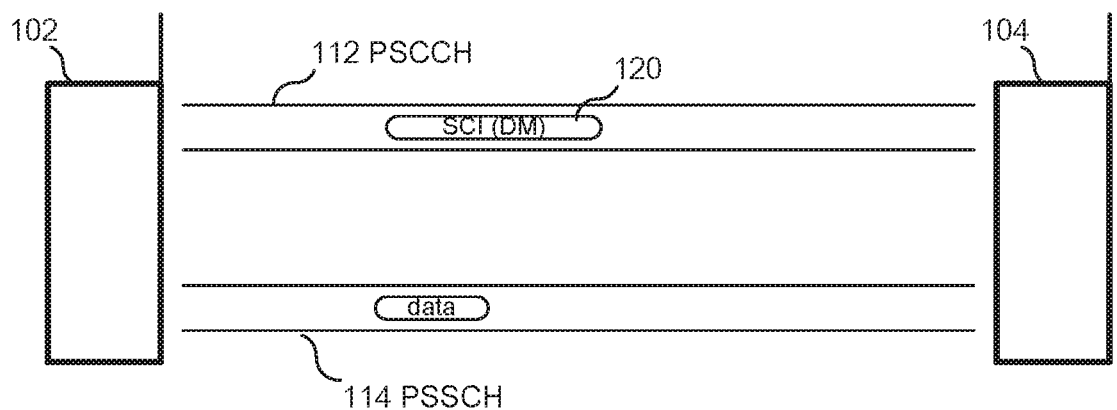
FIGS. 1A and 1B illustrate D2D communication scenarios.
Figure 1B:
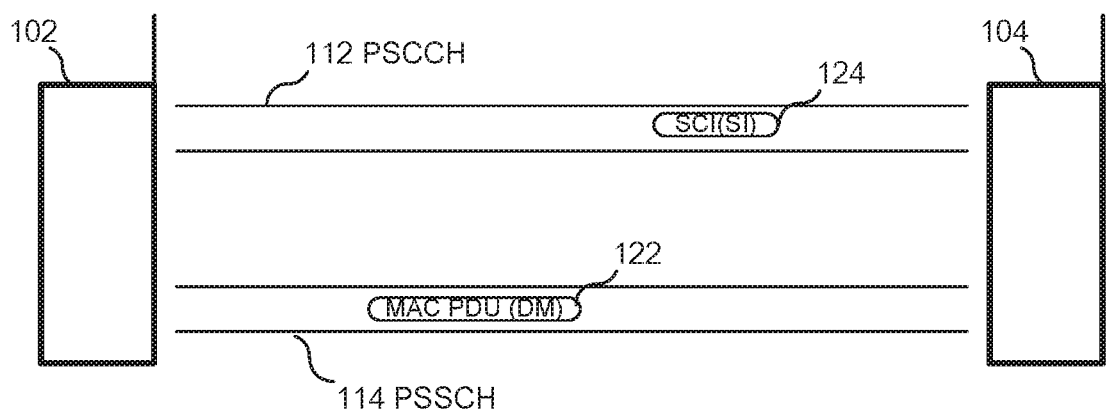

Referring now to FIGS. 1A and 1B, these figures show D2D communication between UE 102 and UE 104, and further illustrate a discovery message (DM) 120 and a discovery message (DM) 122 being carried on the PSCCH and the PSSCH, respectively. More specifically, FIG. 1A shows UE 102 (i.e., the Tx UE) transmitting, during a subframe, SCI on the PSCCH, where the SCI contains DM 120, and FIG. 1B shows UE 102 transmitting, during a subframe, a MAC PDU on the PSSCH, where the MAC PDU contains DM 122. As also shown in FIG. 1B, UE 102, may transmit on the PSCCH an SCI 124 comprising scheduling information (SI), where the SCI 124 is transmitted before the MAC PDU is transmitted and the SI includes information that enable UE 104 to find and decode the MAC PDU.

If more than one configuration is supported by UEs 102 and 104, or if more than one types of discovery message can be transmitted on the same physical channel, then the different cases may be differentiated by one of the following approaches: i) a few bits in SCI are used to indicate different configurations and/or different cases and/or ii) different SCI format to indicate different configurations and/or different cases.

Physical Channels for Carrying Discovery Messages

Discovery messages may be transmitted with different periodicities and/or different payload sizes depending on the targeted use cases, applications, and/or service types. Different configurations as described above can be considered for efficient transmission of discovery messages. Note that even for a given scenario different message types (e.g., message 1 and message 2) can have different transmission configurations, including, for example, the configurations described below.

Configuration 1

In configuration 1, UE 102 (or UE 104), during a subframe, wirelessly transmits a control message (e.g., SCI) on the PSCCH and this control message includes a discovery message (i.e., a message that contains sidelink discovery information (SDI)). For example, when the payload size of the discovery message (e.g., message 1 or message 2) is small, then, it can be included in SCI and transmitted directly on PSCCH. Any UE in the vicinity of UE 102 (or UE 104) can directly receive the control message by blindly decoding the PSCCH as is known in the art, and thereby obtain the discovery message. By obtaining the discovery message in this way, the receiving (Rx) UE does not need to do any further processing (e.g., does not need to decode the PSSCH). This not only reduces UE complexity, but also reduces discovery latency. Moreover, typically, PSCCH has a tighter performance requirement compared to PSSCH, which implies that this configuration can provide more reliable discovery message transmission as well.

In some embodiments, the control message transmitted during the subframe includes only the discovery message (i.e., no other information such as, for example, data scheduling related control information is included in the control message). In some other embodiments, the control message includes the discovery message plus a set of bits (e.g., one or more bits) that indicate a message type or a configuration identifier. For example, the bits may indicate that the control message consists of only the discovery message or the bits may indicate that the control message includes other information in addition to the discovery message). In other embodiments, the format of the control message provides information as to the contents of the control message. For instance, different configurations or cases can be distinguished by using different SCI formats. By detecting the SCI format, a UE knows how to interpret the SCI carried on PSCCH.

Additionally, in some embodiments all discovery messages are transmitted on PSCCH (i.e., the PSDCH is not used).

Configuration 2

In configuration 2, UE 102 (or UE 104), during a subframe, wirelessly transmits a control message on the PSCCH and this control message includes a discovery message and may also include other information, such as, for example, PSSCH scheduling related control information. For instance, sidelink discovery information (SDI) and scheduling information can be encoded as SCI and this SCI can be transmitted on the PSCCH in the conventional manner. In such an example, the SDI uses only part of the SCI information bits, and the rest of the SCI bits can be used for other info such as scheduling normal SL data transmissions on the PSSCH.

For example, a discovery response message (message 2) may have a small payload size (e.g., 1-bit ACK/NACK) on matching indication for required radio capabilities, and this small (e.g., 1-bit) response message could be carried on PSCCH, while the rest of the SCI bits can be used for scheduling a normal PSSCH transmission if there is SL data to be transmitted.

In another example, the discovery message (message 1 or message 2) with small payload size is encoded as part of SCI bits, a few bits in SCI could be used for indicating the message type or configuration ID for the corresponding message transmission, while the rest SCI bits can be used for scheduling a normal PSSCH transmission if there is SL data to be transmitted.

Configuration 3

In configuration 3, UE 102 (or UE 104), during a subframe, wirelessly transmits a data message (e.g., a MAC PDU) on the PSSCH, wherein the data message includes a discovery message (e.g., a service data unit (SDU) of the data message may contain the discovery message). This configuration can be used to support the transmission of discovery messages with varied payload sizes, especially when the payload size is large and cannot be carried on PSCCH in one subframe. The discovery message can be multiplexed with other SL data on different logical channels in the same PSSCH MAC PDU. A special logical channel ID or a special packet tag (such as PPPP), e.g. associated to a dedicated sidelink bearer, could be (pre)configured to indicate whether it is discovery message transmitted on that logical channel. Different tags may be used for transmission of message 1 and message 2.

The data message carrying the discovery message and/or other data message is scheduled by PSCCH. That is, for example, before the data message (e.g., MAC PDU) is wirelessly transmitted by the UE, the UE wirelessly transmits SCI on the PSCCH, wherein the SCI comprises the information that a receiving UE will need to find and decode the data message. The receiving UE obtains this SCI by blindly searching a search space for the SCI as is known in the art. The control resource set (CORESET) or PSCCH resource pool configuration and the search space configuration for PSCCH scheduling PSSCH carrying discovery messages can be either configured by the network or preconfigured.

Configuration 4

In configuration 4, a discovery message may be divided into parts (e.g., a first part and a second part). The first part is carried on PSCCH, while the second part is carried on the PSSCH (assuming the UE decides to transmit the second part). By first decoding the first part of the discovery message carried on PSCCH, the receiving UE may decide whether it shall proceed with a further decoding of the discovery information carried on the PSSCH (e.g., the second part of the discovery message). Accordingly, in configuration 4, UE 102 (or UE 104), during a subframe, may wirelessly transmit a control message (e.g., SCI) on the PSCCH and this control message may include the first part of a discovery message (the control message may also include other information, such as, for example, PSSCH scheduling related control information which schedules the transmission of a data message on the PSSCH that carries the second part of the discovery message). Hence, in configuration 4, a discovery message may be transmitted partly on PSCCH, and partly on the PSSCH scheduled by this PSCCH.

For example, a discovery message (e.g., message 1) may include quality-of-service (QoS) information indicating a QoS requirement for the service of interest (e.g., the expected QCI/5QI index), a discovery intention code, and/or UE capability information (e.g., information indicating one or more capabilities of the UE transmitting the discovery message). The UE that is transmitting this discovery message may logically divide the message into two parts and the UE may first transmit the first part of the message over the PSCCH and then transmit the second part of the message over the PSSCH.

For instance, one or more of the QoS information, intention code or capability information could be encoded as (part of) an SCI message that is wirelessly transmitted over the PSCCH. The SCI could also contain a flag indicating transmission of the rest of the discovery message in PSSCH. The rest of the discovery message is carried on the associated PSSCH.

A UE in proximity to the UE that transmitted the SCI containing the first part of the discovery message obtains the SCI (e.g., using a blind search as mentioned above) and decodes the first part of the discovery message (e.g., QoS information, intention code, and/or capability information). Based on the information included in the first part of the discovery message, the receiving UE decides whether or not to obtain the second part of the message.

For example, if QoS information is included in the SCI, then the receiving UE first determines whether it can fulfill the QoS requirement identified by the QoS information (e.g. the QCI/5QI level) from receiving perspective. If the receiving UE determines that it can fulfill the QoS requirement, the receiving UE will proceed to decode the PSSCH transmission containing the second part of the discovery message, otherwise the receiving UE may decide to ignore proceeding to decode the second part of the discovery message. As another example, if the SCI includes information indicating a discovery service of interest, the receiving UE proceeds to decode the second part of the discovery message only if there is a match with the service of interest required by the transmitter and the service in which the receiver is interested/or can provide. If the SCI indicates that the associated PSSCH only carries the second part of the discovery message, the receiving UE may directly ignore decoding of the associated PSSCH if the receiving UE decides not to obtain the second part of the discovery message based on the first part of the discovery message obtained from SCI.

In an alternative embodiment, the second part of the discovery message may be transmitted by the transmitting UE only if the transmitting UE has received a positive acknowledgment (ACK) from at least one receiving a UE. In this alternative embodiment, the receiving UE decides whether or not to send to the transmitting UE an ACK based on the information included in the first part of the discovery message. In response to receiving an ACK transmitted by a receiving UE in response to the first part of the discovery message, the transmitting UE may transmit SCI on the PSCCH that schedules the transmission of a data message on the PSSCH that contains the second part of the discovery message.

Hence, the sidelink discovery information (SDI) carried on the PSCCH (e.g., first part of the discovery message) could be transmitted more frequently while the SDI carried on the PSSCH (e.g., second part of the message) is transmitted, for example, only when there exists UEs in the vicinity of the transmitting UE that indicate that they can fulfill the QoS requirement and/or interested in/can provide the service that is being discovered.

Signaling of PHY Channel Transmission of Discovery Messages

A combination of two or more different configurations described above can be used to support flexible and efficient transmission of discovery messages. For a given configuration, e.g., configuration 2, it is also possible that an SCI message may include a discovery message (e.g., a type 1 and/or type 2 discovery message) and/or other types of messages. For example, message 1 and/or message 2 for SL discovery procedure, and control information for scheduling normal SL data transmission may be transmitted together as SCI on PSCCH.

To distinguish different configurations, or different types of messages, or both, two different approaches can be considered. These two approaches can be used either separately or jointly.

In a first approach (Approach 1) a set of bits in SCI is used to indicate the case/configuration ID. For example, assume that configurations 1, 2 and 3 are supported for transmission of type 1 discovery messages. That is: i) message 1 may be included in an SCI that does not also contains other information (e.g., no PSSCH scheduling related control information also included in SCI); ii) message 1 may be included in an SCI that also contains, for example, PSSCH scheduling related control information; and iii) message 1 may be carried on PSSCH only, scheduled by an SCI. Accordingly, two (2) bits in SCI can be used to indicate the configuration ID, according to which the UE knows how to interpret the SCI bits carried on PSCCH, and how to decode the discovery message and other control information.

In another example of the first approach, assume that configuration 2 is used for transmission of discovery messages. In such a scenario, a PSCCH may carry: (case 1) message 1+data scheduling; (case 2) message 2+data scheduling; (case 3) message 1+message 2+data scheduling; or (case 4) only data scheduling. Then, 2 bits in the SCI can be used to indicate the Case ID (message type that is carried on PSCCH), according to which the UE knows how to interpret the SCI bits carried on PSCCH, and how to decode the discovery message and other control information.

In a second approach (Approach 2) different SCI formats are used. That is, different configurations or cases can also be distinguished by using different SCI formats. By detecting the SCI format, a UE knows how to interpret the SCI carried on PSCCH.

Figure 2:
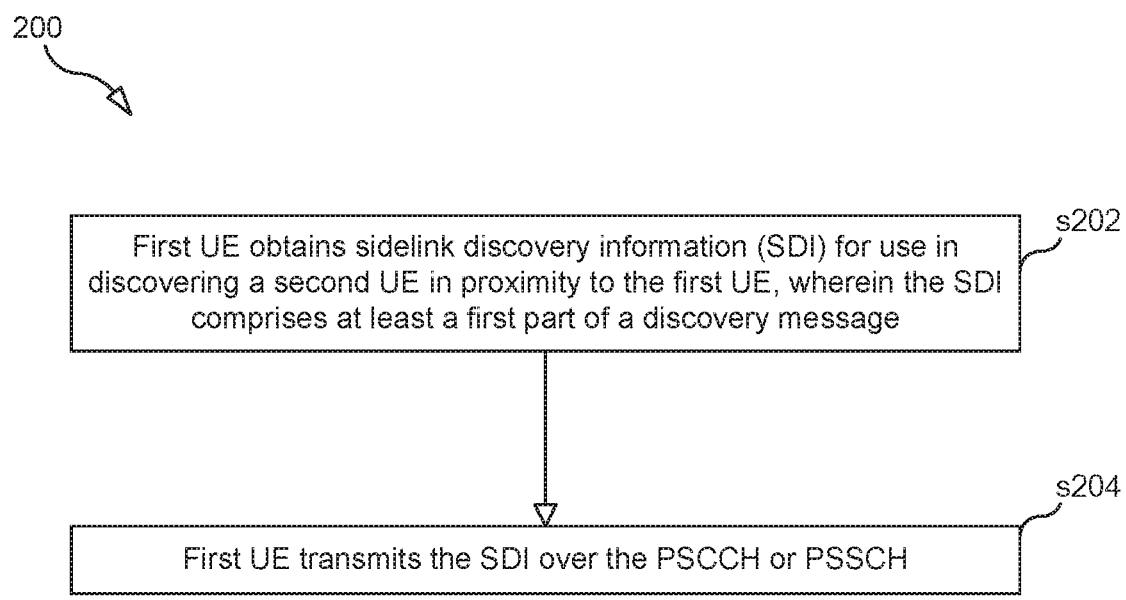
FIG. 2 is a flow chart illustrating a process according to one embodiment.

Referring now to FIG. 2, FIG. 2 is a flowchart illustrating a process 200, according to an embodiment, for device discovery. Process 200 may begin with a step s202.

In step s202, a first UE (e.g., UE 102 or 104) obtains (e.g., generates, retrieves, receives) sidelink discovery information (SDI) for use in discovering a second UE (e.g., UE 104 or 102) in proximity to the first UE, wherein the SDI comprises at least a first part of a discovery message.

In step s204, the first UE transmits the SDI over a physical sidelink channel, PSCH, characterized in that: the PSCH is a physical sidelink control channel (PSCCH) or the PSCH is a physical sidelink shared channel (PSSCH).

In an embodiment in which the PSCH is the PSCCH, the step of transmitting the SDI over the PSCCH comprises transmitting sidelink control information (SCI) over the PSCCH, wherein the SCI transmitted over the PSCCH comprises the SDI. In some embodiments, the SCI consists only of the SDI, or the SCI further comprises a set of one or more bits that are separate from the SDI and the set of bits indicates to a UE receiving the SCI that the SCI comprises SDI. In other embodiments, the SCI further comprises scheduling information for a transmission scheduled to take place over the PSSCH, the SCI further comprises a set of one or more bits that are separate from the SDI and separate from the scheduling information, and the set of bits indicates to a UE receiving the SCI that the SCI comprises both SDI and scheduling information. In some embodiments, the SCI has a particular format, and the particular format of the SCI indicates to a UE receiving the SCI that the SCI comprises SDI.

In an embodiment in which the PSCH is the PSSCH, the step of transmitting the SDI over the PSSCH comprises transmitting a MAC PDU over the PSSCH, wherein the MAC PDU comprises a MAC SDU that comprises the SDI. In such an embodiment, the method may further include, prior to transmitting the MAC PDU over the PSSCH, transmitting SCI over the PSCCH, wherein the SCI comprises scheduling information for enabling the second UE to receive the PSSCH comprising the MAC PDU. In some embodiments, the SCI transmitted over the PSCCH indicates to a UE receiving the SCI that the MAC PDU includes SDI, and/or the MAC PDU comprises a header comprising information (e.g., logical channel ID) indicating that the MAC PDU includes SDI.

In some embodiments, the discovery message comprises a first part and a second part, the SDI is transmitted over the PSCCH, and the SDI includes the first part of the discovery message but not the second part of the discovery message. In such an embodiment, the process may further include the first UE transmitting a MAC PDU on the PSSCH, wherein the MAC PDU comprises the second part of the discovery message. In some embodiments, the first part of the discover message comprises: i) information indicating a required quality of service, QoS, ii) information indicating a UE capability, and/or iii) information indicating a service type (e.g., a discovery intention code).

Figure 3:
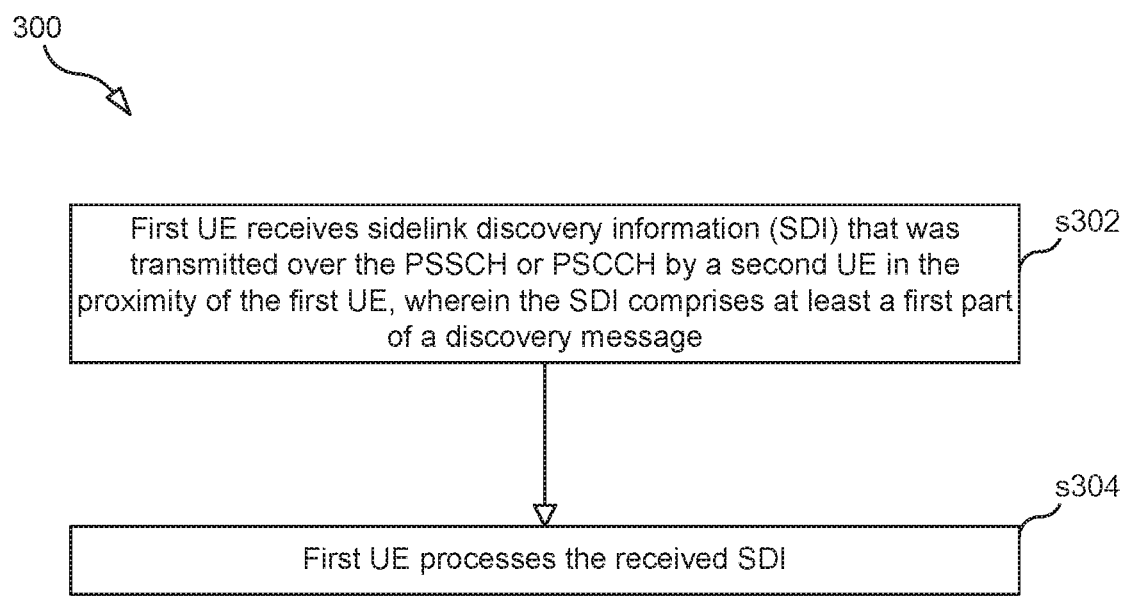
FIG. 3 is a flow chart illustrating a process according to one embodiment.

Referring now to FIG. 3, FIG. 3 is a flowchart illustrating a process 300, according to an embodiment, for device discovery. Process 300 may begin with a step s302.

In step s302, a first UE (e.g., UE 104 or 102) receives, over a physical sidelink channel (PSCH) sidelink discovery information (SDI), wherein the SDI was transmitted by a second UE in proximity to the first UE, the SDI comprises at least a first part of a discovery message, and the PSCH is the PSCCH or the PSCH is the PSSCH.

In step s304, the first UE processes the received SDI.

In an embodiment in which the PSCH is the PSCCH, the step of receiving the SDI over the PSCCH comprises the first UE performing blind decoding to obtain sidelink control information (SCI) transmitted over the PSCCH (e.g., the first UE attempts to decode a set of PSCCH candidates in a subframe), and the obtained SCI comprises the SDI. In some embodiments, the SCI consists only of the SDI, or the SCI further comprises a set of one or more bits that are separate from the SDI and the set of bits indicates to a UE receiving the SCI that the SCI comprises SDI. In other embodiments, the SCI further comprises scheduling information for a transmission scheduled to take place over the PSSCH, the SCI further comprises a set of one or more bits that are separate from the SDI and separate from the scheduling information, and the set of bits indicates to a UE receiving the SCI that the SCI comprises both SDI and scheduling information. In some embodiments, the SCI has a particular format, and the particular format of the SCI indicates to a UE receiving the SCI that the SCI comprises SDI.

In some embodiments, the discovery message comprises a first part and a second part, the SDI is received over the PSCCH, and the SDI includes the first part of the discovery message but not the second part of the discovery message. In such an embodiment, the process may further include the first UE determining whether or not to attempt to obtain the second part of the discovery message based on the information included in the first part of the discovery message. In some embodiments, the first part of the discover message comprises: i) information indicating a required quality of service, QoS, ii) information indicating a UE capability, and/or iii) information indicating a service type (e.g., a discovery intention code).

Figure 4:
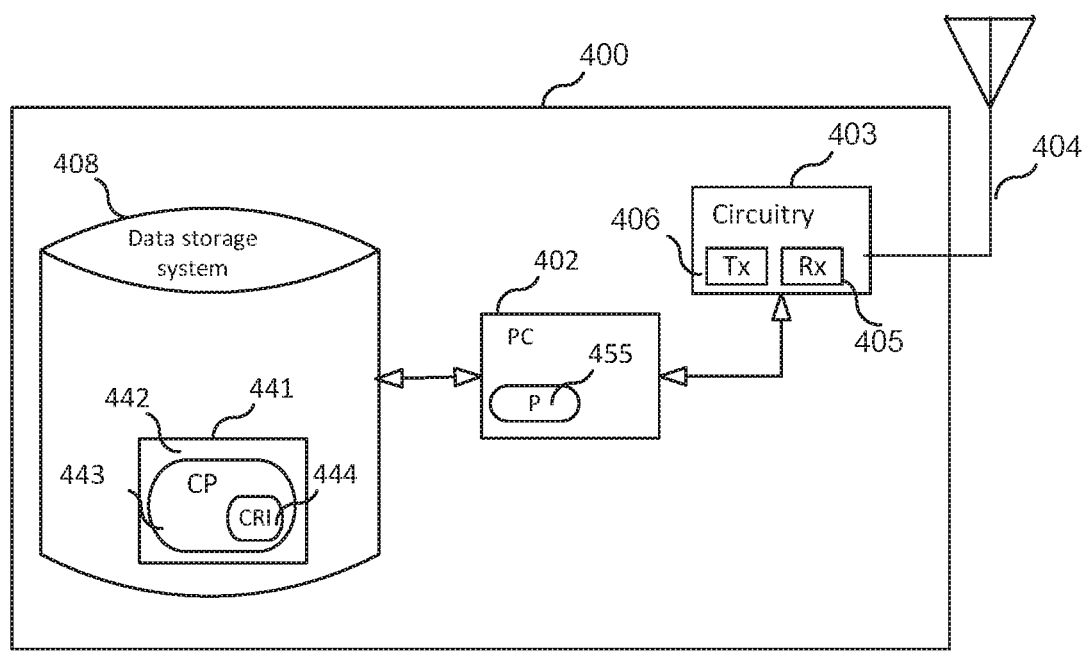
FIG. 4 is a block diagram of an apparatus according to one embodiment.

FIG. 4 is a block diagram of an apparatus 400, according to some embodiments for performing methods disclosed herein. That is, apparatus 400 can be used to implement UE 102 or UE 104. As shown in FIG. 4, apparatus 400 may comprise: processing circuitry (PC) 402, which may include one or more processors (P) 455 (e.g., a general purpose microprocessor and/or one or more other processors, such as an application specific integrated circuit (ASIC), field-programmable gate arrays (FPGAs), and the like), which processors may be co-located or distributed in different locations; circuitry 403 (e.g., radio transceiver circuitry comprising an Rx 405 and a Tx 406) coupled to an antenna system 404 for wireless communication); and a local storage unit (a.k.a., "data storage system") 408, which may include one or more non-volatile storage devices and/or one or more volatile storage devices. In embodiments where PC 402 includes a programmable processor, a computer program product (CPP) 441 may be provided. CPP 441 includes a computer readable medium (CRM) 442 storing a computer program (CP) 443 comprising computer readable instructions (CRI) 444. CRM 442 may be a non-transitory computer readable medium, such as, magnetic media (e.g., a hard disk), optical media, memory devices (e.g., random access memory, flash memory), and the like. In some embodiments, the CRI 444 of computer program 443 is configured such that when executed by PC 402, the CRI causes apparatus 400 to perform steps described herein (e.g., steps described herein with reference to the flow charts). In other embodiments, apparatus 400 may be configured to perform steps described herein without the need for code. That is, for example, PC 402 may consist merely of one or more ASICs. Hence, the features of the embodiments described herein may be implemented in hardware and/or software.

Figure 5A:
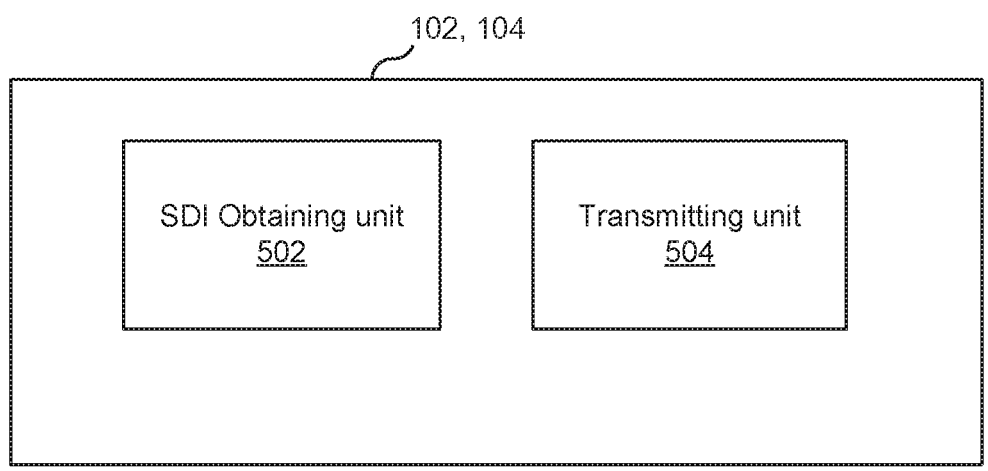
FIG. 5A is a diagram showing functional units of a Tx UE according to an embodiment.

FIG. 5A is a diagram showing functional units of a Tx UE (e.g., UE 102 or 104) according to an embodiment. As shown in FIG. 5, the UE includes an obtaining unit 502 for obtaining SDI and a transmitting unit 504 for transmitting the obtained SDI over the PSSCH or the PSCCH.

Figure 5B:
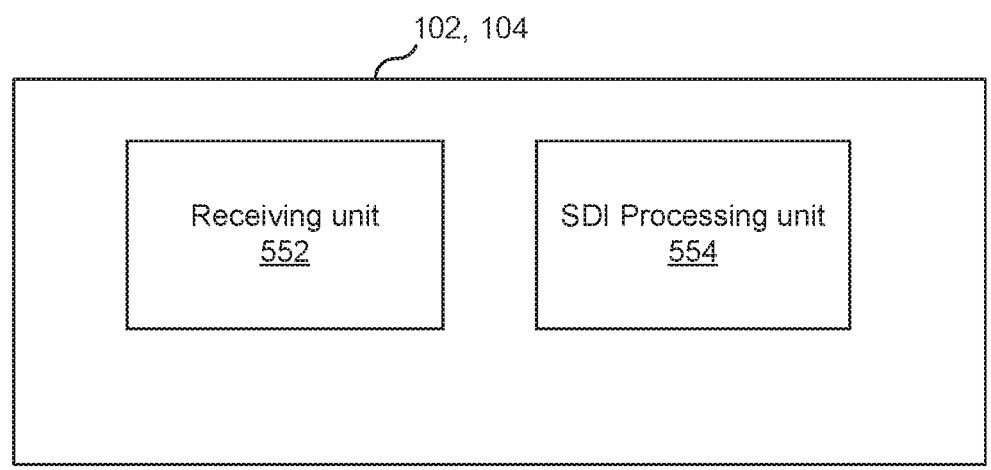
FIG. 5B is a diagram showing functional units of an Rx UE according to an embodiment.

FIG. 5B is a diagram showing functional units of an Rx UE (e.g., UE 102 or 104) according to an embodiment. As shown in FIG. 6, the UE includes a receiving unit 602 for receiving SDI that was transmitted over the PSCCH or PSSCH and an SDI processing unit 604 for processing the received SDI.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

Abbreviations

SL Sidelink
Tx Transmit/Transmitter
Rx Receive/Receiver
BSM Basic Safety Message
BW Bandwidth
BSR Buffer Status Report
CAM Cooperative Awareness Message
CBR Channel Busy Ratio
DPTF Data Packet Transmission Format
D2D Device-to-Device Communication
DENM Decentralized Environmental Notification Message
DSRC Dedicated Short-Range Communications
eNB eNodeB
ETSI European Telecommunications Standards Institute
LTE Long-Term Evolution
NW Network
RS Reference Signals
TF Transport Format
SAE Society of the Automotive Engineers
UE User Equipment
V2I Vehicle-to-Infrastructure
V2P Vehicle-to-Pedestrian
V2V Vehicle-to-(vehicle) communication
V2X Vehicle-to-anything-you-can-imagine
MAC Medium Access Control
PDU Packet Data Unit
3GPP Third Generation Partnership Project
RRC Radio Resource Control
ProSe Proximity Services
PRB Physical Resource Block
ME Mobile Equipment
ID Identifier
PDB Packet Delay Budget
CBR Congestion Busy Ratio
SDU Service Data Unit
PDU Protocol Data Unit
BLER Block Error Rate
MCS Modulation Coding Scheme
TBS Transport Block Size
MIMO Multiple Input Multiple Output
PSCCH Physical Sidelink Control Channel
ITS Intelligent Transport System
PPPP Prose Per Packet Priority
QoS Quality of Service
QCI QoS Class Identifier
5QI 5G QoS Indicator

The invention claimed is:

1. A method for device discovery, the method comprising:
a first user equipment (UE) obtaining sidelink discovery information (SDI) for use in discovering a second UE in proximity to the first UE, wherein the SDI comprises at least a first part of a discovery message;
the first UE transmitting the SDI over a physical sidelink channel (PSCH), wherein
the PSCH is a physical sidelink shared channel (PSSCH), transmitting the SDI over the PSSCH comprises transmitting a medium access control (MAC) protocol data unit (PDU) over the PSSCH, wherein the MAC PDU comprises a service data unit (SDU) that comprises the SDI, and
the method further comprises, prior to transmitting the MAC PDU over the PSSCH, transmitting sidelink control information (SCI) over the PSCCH, wherein the SCI comprises scheduling information for enabling the second UE to receive the PSSCH carrying the MAC PDU.

2. The method of claim 1, wherein
the SCI transmitted over the PSCCH indicates to a UE receiving the SCI that the MAC PDU includes SDI, and/or
the MAC PDU comprises a header comprising information indicating that the MAC PDU includes SDI.

3. A method for device discovery, the method comprising:
a first user equipment (UE) obtaining sidelink discovery information (SDI) for use in discovering a second UE in proximity to the first UE, wherein the SDI comprises at least a first part of a discovery message;
the first UE transmitting the SDI over a physical sidelink control channel (PSCCH), wherein
the discovery message comprises the first part and a second part,
the SDI does not include the second part of the discovery message,
the first part of the discover message comprises: i) information indicating a required quality of service, ii) information indicating a UE capability, and/or iii) information indicating a service type, and
the method further comprises the first UE transmitting a MAC PDU on a physical sidelink shared channel (PSSCH), wherein the MAC PDU comprises the second part of the discovery message.

4. The method of claim 3, wherein
transmitting the SDI over the PSCCH comprises transmitting sidelink control information (SCI) over the PSCCH, wherein the SCI transmitted over the PSCCH comprises the SDI.

5. The method of claim 4, wherein
the SCI consists only of the SDI, or
the SCI further comprises a set of one or more bits that are separate from the SDI and the set of bits indicates to a UE receiving the SCI that the SCI comprises SDI.

6. The method of claim 4, wherein
the SCI further comprises scheduling information for a transmission scheduled to take place over the PSSCH,
the SCI further comprises a set of one or more bits that are separate from the SDI and separate from the scheduling information, and
the set of bits indicates to a UE receiving the SCI that the SCI comprises both SDI and scheduling information.

7. The method of claim 4, wherein
the SCI has a particular format, and
the particular format of the SCI indicates to a UE receiving the SCI that the SCI comprises SDI.

8. A computer program product comprising a non-transitory computer readable medium storing a computer program comprising instructions which, when executed by processing circuitry, cause the processing circuitry to carry out the method of claim 3.

9. The method of claim 3, wherein the first part of the discovery message comprises quality of service (QoS) information indicating a required quality of service.

10. The method of claim 3, wherein the first part of the discovery message comprises service type information indicating a service type.

11. The method of claim 3, wherein the first part of the discovery message comprises capability information indicating a UE capability.

12. A method for device discovery, the method comprising:
a first user equipment (UE) receiving, over a physical sidelink channel (PSCH), sidelink discovery information (SDI); and
the first UE processing the received SDI, wherein
the SDI was transmitted by a second UE in proximity to the first UE,
the SDI comprises at least a first part of a discovery message, and
the PSCH is a physical sidelink control channel (PSCCH), wherein
the discovery message comprises the first part and a second part,
the SDI does not include the second part of the discovery message,
the first part of the discover message comprises: i) information indicating a required quality of service (QoS), ii) information indicating a UE capability, and/or iii) information indicating a service type, and
the method further comprises the first UE determining whether or not to attempt to obtain the second part of the discovery message based on the information included in the first part of the discovery message.

13. The method of claim 12, wherein
receiving the SDI comprises the first UE performing blind decoding to obtain sidelink control information (SCI) transmitted over the PSCCH, and
the obtained SCI comprises the SDI.

14. A computer program product comprising a non-transitory computer readable medium storing a computer program comprising instructions which, when executed by processing circuitry, cause the processing circuitry to carry out the method of claim 12.

15. A first user equipment (UE), the first UE comprising processing circuitry, a receiver, and a transmitter, the first UE being adapted to:
obtain sidelink discovery information (SDI) for use in discovering a second UE in proximity to the first UE, wherein the SDI comprises at least a first part of a discovery message; and
employ the transmitter to transmit the SDI over a physical sidelink control channel (PSCCH), wherein
the discovery message comprises the first part and a second part,
the SDI does not include the second part of the discovery message,
the first part of the discover message comprises: i) information indicating a required quality of service, ii) information indicating a UE capability, and/or iii) information indicating a service type, and
the first UE is configured to transmit a MAC PDU on a physical sidelink shared channel (PSSCH), wherein the MAC PDU comprises the second part of the discovery message.

16. A first user equipment (UE), the UE comprising:
a receiver for receiving, over a physical sidelink channel (PSCH), sidelink discovery information (SDI); and
processing circuitry, comprising a processor, configured to process the received SDI, wherein
the SDI was transmitted by a second UE in proximity to the first UE,
the SDI comprises at least a first part of a discovery message,
the PSCH is a physical sidelink control channel (PSCCH),
the discovery message comprises the first part and a second part,
the SDI does not include the second part of the discovery message,
the first part of the discover message comprises: i) information indicating a required quality of service (QoS), ii) information indicating a UE capability, and/or iii) information indicating a service type, and the first UE is configured to determine whether or not to attempt to obtain the second part of the discovery message based on the information included in the first part of the discovery message.

\* \* \* \* \*